United States Patent [19]

Riccio

[11] 4,431,903
[45] Feb. 14, 1984

[54] SOLDERING IRON WITH FLAT BLADE HEATING ELEMENT

[75] Inventor: Ronald Riccio, Hermosa Beach, Calif.

[73] Assignee: Eldon Industries, Hawthorne, Calif.

[21] Appl. No.: 319,598

[22] Filed: Nov. 9, 1981

[51] Int. Cl.³ .......................... H05B 3/06; B23K 3/02
[52] U.S. Cl. .................. 219/238; 219/227; 219/236; 219/533; 228/51
[58] Field of Search .............. 219/221, 227–231, 219/236–241, 533; 228/19, 20, 51–55

[56] References Cited

U.S. PATENT DOCUMENTS

| | | | |
|---|---|---|---|
| 1,128,102 | 2/1915 | Campbell | 219/238 |
| 1,363,473 | 12/1920 | Kuhn et al. | 219/238 X |
| 2,735,923 | 2/1956 | Juvinall et al. | 219/241 X |
| 3,048,687 | 8/1962 | Knowles | 219/237 X |
| 3,105,135 | 9/1963 | Finch | 219/237 X |
| 3,121,781 | 2/1964 | Schoenwald | 219/237 |
| 3,287,541 | 11/1966 | Weller et al. | 219/241 |
| 3,646,577 | 2/1972 | Ernst | 219/241 |
| 3,800,122 | 3/1974 | Farmer | 219/241 X |
| 4,086,465 | 4/1978 | Sylvester | 219/236 |

FOREIGN PATENT DOCUMENTS

| | | | |
|---|---|---|---|
| 9358 | 9/1933 | Australia | 219/238 |
| 682406 | 10/1939 | Fed. Rep. of Germany | 219/229 |
| 76611 | 10/1961 | France | 219/238 |
| 589050 | 6/1947 | United Kingdom | 219/240 |

*Primary Examiner*—A. Bartis
*Attorney, Agent, or Firm*—Edward D. O'Brian; K. H. Boswell

[57] ABSTRACT

An electric soldering iron having an elongated handle with an electric heating element attached therein and including a removable tip member located to receive heat from the heating element and a holding member to hold the tip relative to the heating element is improved by forming said heating element as an elongated flat blade heating element having an elongated flat planar heated surface. The heating element is so located in the handle to extend outwardly from the handle. The tip member includes a body having an elongated flat planar heat transfer surface which fits against the planar heated surface of the heating element and receives heat therefrom. The tip member further includes an operative tip extending away from the remainder of the tip member. A retaining tube detachably secured at one end to the handle fits over the heating element and tip member and except for its operative tip and maintains them in a fixed relationship with respect to each other and to the handle. A bowed spring located in the retaining tube biases the planar surfaces of the heating element and tip member into intimate contact with each other. The operative tip is exposed out of the other end of the retaining tube in position for soldering.

6 Claims, 4 Drawing Figures

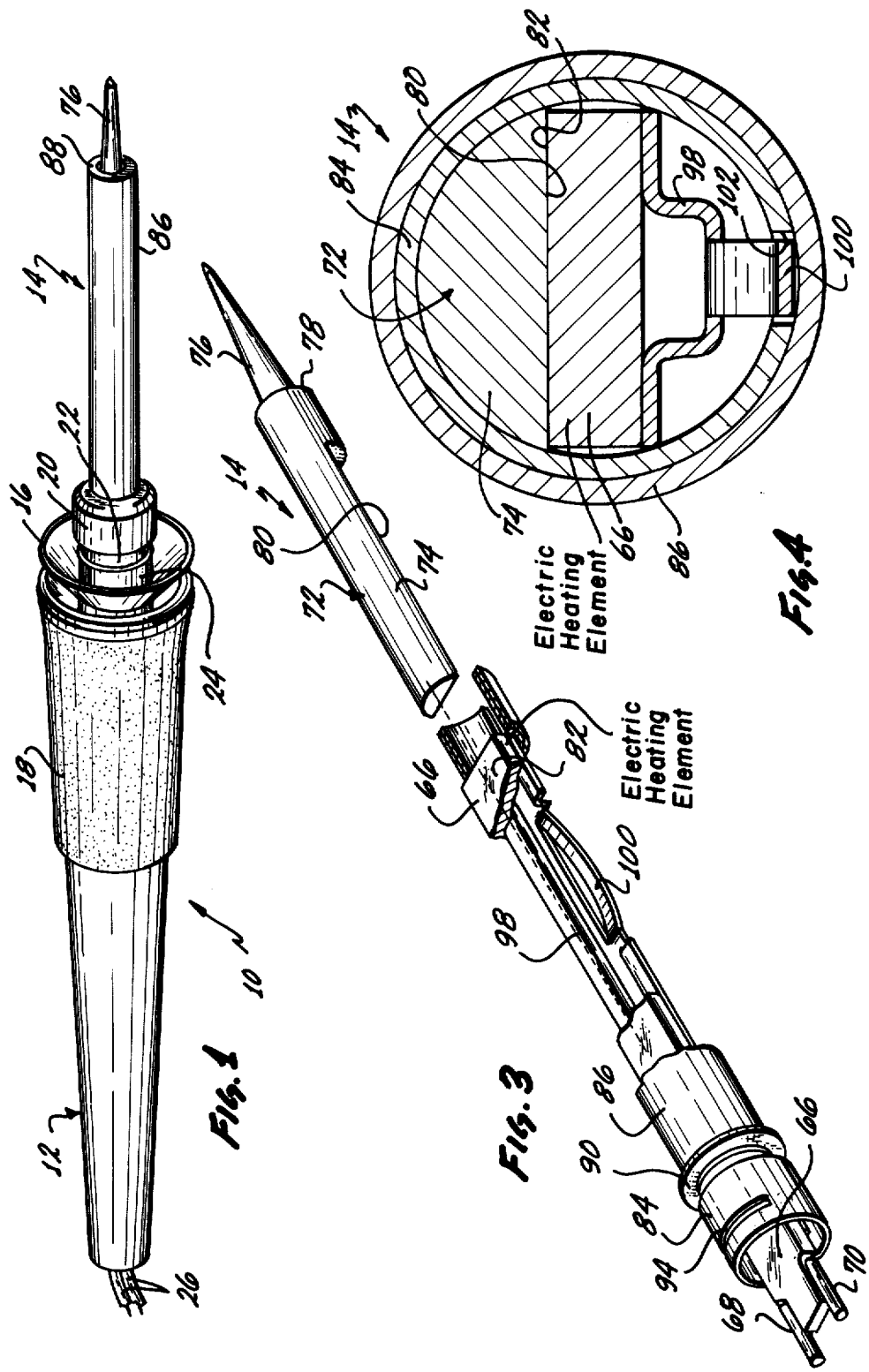

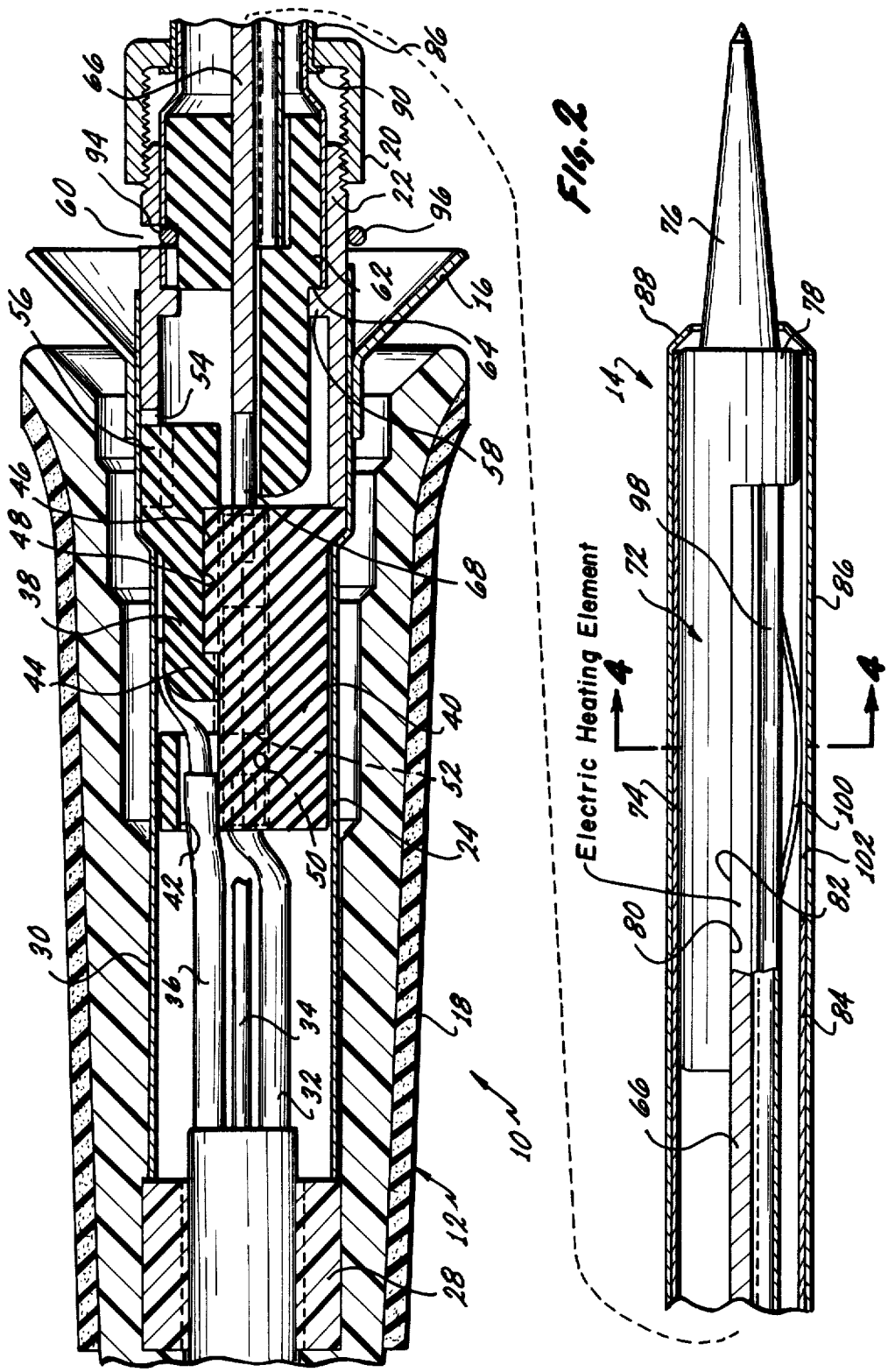

SOLDERING IRON WITH FLAT BLADE HEATING ELEMENT

BACKGROUND OF THE INVENTION

This invention is directed to an improvement in an electric soldering iron. The improvement is directed to an elongated heating element which mates against and transfers heat to a tip member which includes an elongated heat receiving surface. The tip member includes an operative tip integrally formed as a portion of it. The main body of the tip member excluding the operative tip and the heating element are maintained within an elongated retaining tube with the operative tip extending out of one end of the retaining tube. The retaining tube is mounted to the handle of the soldering iron to maintain the heating element and the tip member in their respective positions.

Presently existing soldering irons usually incorporate a relatively large thermal mass in association with a heating element. The thermal mass receives heat from the heating element and supplies it to a tip. Because of the bulk of the thermal mass used in these irons, there is a time lag which is necessary for the heating element to heat up this large thermal mass. Once heated, the large thermal mass supplies heat to the tip. The tip withdraws heat from the thermal mass as soldering joints are formed with the soldering iron.

Generally, the soldering irons having the large thermal masses noted in the previous paragraph are somewhat inefficient in transferring heat from the heating element to the thermal mass. This is basically because of the design of the thermal mass and the heating elements themselves. The heat transfer between the heating element and the larger thermal mass is regulated in a certain degree between the amount of surface contact between the same. Since the bulk of the large thermal mass is internal to the mass and does not form a part of its outside surface, the heat transfer between the heating element and the thermal mass is proportionately low compared to the amount of thermal mass.

Once heated, the large thermal mass of the above noted soldering irons do retain a considerable amount of heat. However, because of the large mass, much of this heat is available to go back to the handle. In order to prevent this, bulky handles which contain a lot of shielding or insulation must be utilized. This, unfortunately, is a disadvantage to the user of the device wherein minimum bulk and weight of the soldering iron is desirable. Further, once the heat is withdrawn from the large thermal mass, it takes considerable heat-up time to once again heat up the thermal mass to a point wherein the tip is hot enough to form the necessary soldering joints. it is thus evident that the presently available soldering irons which incorporate these large thermal masses are disadvantageous to the user because of bulk and because of their heat up time.

Further, the soldering irons noted above usually have a replaceable tip which screws onto the thermal mass. Both the tip and the thermal mass are generally made of a high heat conductive material such as copper or a copper alloy. The screw threads, therefore, between the tip and the large thermal mass of necessity are also made of this alloy and must be plated. Plating, however, is not too effective in threaded areas. During the soldering procedure, because of the use of fluxes and the like, fumes are generated which interact with the metallic material of the tips and the thermal mass. Both the presence of the fumes are the repetitive cycling between hot and cold of both the tips and the mass tends to fuse the tips to the mass. When it becomes necessary to change the tips because of wear to the tip or the desirability of using a tip having a different design, many times the user of the above noted soldering irons finds it impossible to remove the tip from the iron because of the fusing of the metal of the tip with the metal of the thermal mass.

BRIEF DESCRIPTION OF THE INVENTION

In view of the above, it is evident that there exists a need for new and improved soldering irons which heat up fast, have good heat recovery, are light in weight and do not conduct large amounts of heat back to the handle. Further, there exists a need for new and improved soldering irons which eliminate the threaded contact between the tip and the thermal mass thus facilitating exchanging of the soldering tip when desirable. It is a broad object of this invention to provide such an improved soldering iron. It is a further object of this invention to provide a soldering iron which performs as outlined above yet because of its construction is highly durable and thus is very utilitarian in production line situations where multiple soldering joints are continuously being made.

These and other objects as will become evident from the remainder of this specification are achieved in an electric soldering iron having an elongated handle, an electrical heating element, an attachment means serving to mount the heating element on the handle, a tip member located so as to receive heat from said heating element and holding means for holding said tip member relative to said heating element in which the improvement comprises the following. The heating element is constructed as an elongated heating element having a flat planar heating surface. The heating element extends outwardly from the attaching means which attaches it to the handle. The tip member is divided into a body portion having a flat planar heat transfer surface for fitting against the heated surface of the heating element and an operative tip extending away from the body. The tip is separated from the body by a shoulder. An elongated retaining tube having ends is fitted with an internal extending flange at one of its ends. The retaining tube is positioned around the body of the tip member and the heating element so as to hold the tip member relative to the heating element in a position allowing contact of the heated surface and the heat transfer surface. The flange of the retaining tube rests against the shoulder on the tip member, with the tip extending outwardly from the heating element through one of the ends of the retaining tube. The holding means comprises means connecting the other end of the retaining tube with the handle so as to prevent movement of the retaining tube and the tip member generally away from the handle.

In the preferred embodiment of the soldering iron of this invention, the attaching means would include a socket means mounted within the handle. The heating element would include a terminal means thereon such that the terminal means is held within the socket means and further a latching means would be included to hold the heating element against removal from the socket means. The latching means would be located so as to permit disengagement of the holding means and removal of the retaining tube from the heating element so as to permit replacement of the tip member.

The preferred embodiment would include a protective tube located generally around the heating element and the body of the tip member. The protective tube would be located within the interior of the retaining tube with the retaining tube fitting closely against the exterior of the protective tube. A tube holding means would be located on the handle adjacent to the attaching means for holding the end of the protective tube.

Preferredly, the tube holding means would be an electrically conductive ferrule located generally around part of the heating element and the protective tube. A spring means would be included between the interior of the protective tube and the exterior of the heating element biasing the heating element toward the tip member. The tip member would be in electrical contact with the protective tube and the protective tube would be in electrical contact with the ferrule. An electric cord for supplying electrical power to the soldering iron would include three conductors insulated one from the other, one of the conductors being electrically connected to the ferrule and thus to the protective tube and the other of the two conductors being in circuit with the heating element.

In the preferred embodiment, said heated surface and said heat transfer surface would be located within the protective tube on the opposite side of said heating element from the spring means. The body of the tip member would fit closely within the interior of the protective tube with the heat transfer surface being closely located adjacent to the heated surface. The heating element would be capable of being moved by the spring so as to hold the heated surface in contact with the heat transfer surface.

Preferredly, both the heated surface and the heat transfer surface would be flat, planar surfaces capable of forming an intimate contact with one another along a substantial portion of the length of the body of the tip member. The intimate contact between the heated surface and the heat transfer surface insures efficient and rapid heat transfer between the heated surface and the heat transfer surface.

BRIEF DESCRIPTION OF THE DRAWINGS

The invention described in this specification will be better understood when taken in conjunction with the drawings wherein:

FIG. 1 is an oblique view of the soldering iron of the invention;

FIG. 2 is a side elevational view in section of the soldering iron of FIG. 1;

FIG. 3 is an exploded view of the tip portion of the soldering iron of FIG. 1; and FIG. 4 is an end elevational view about the lines 4—4 of FIG. 2.

The invention described in this specification and illustrated in the drawings utilizes certain principles and/or concepts which are set forth in the claims appended to this specification. Those skilled in the soldering iron arts will realize that these principles and/or concepts are capable of being utilized in a variety of embodiments differing from the embodiment utilized for illustrative purposes herein. For this reason, this invention is to be construed in light of the claims appended hereto and is not to be construed as being limited to the exact embodiment utilized in this specification for illustrative purposes.

DETAILED DESCRIPTION OF THE INVENTION

The soldering iron 10 of this invention generally includes a handle portion 12 and a tip portion 14. Intermediate between the handle 12 and the tip portion 14 is a heat deflector 16. The handle 12 includes a grip 18 located around certain portions of its surface to facilitate holding the soldering iron 10.

A retaining nut 20 is interspaced between the tip portion 14 and a ferrule 22, a portion of which can be seen exposed in FIG. 1. The ferrule 22, in turn, is mated with a handle insert 24, a portion also of which can be seen in FIG. 1. The heat deflector 16 fits around the handle insert 24 as is seen in FIG. 1 and can be spot welded to it. The remaining component seen in FIG. 1 is a cord 26 which extends out of the non-working end of the soldering iron 10. Preferably, the ferrule 22, the handle insert 24 and heat deflector 16 all are formed of a stainless steel.

Referring now to FIG. 2, the internal components of the soldering iron 10 will generally be explained for the most part by moving from left to right in FIG. 2. The cord 26 is maintained within the handle 12 by a cord clamp 28. Abutting against the cord clamp 28 is the handle insert 24. The handle insert 24 is press fitted within the handle 12 and rests against a plurality of identical longitudinally extending projections, only one of which, projection 30, can be seen in the figures. These projections are integrally formed with and are symmetrically spaced around the interior of the handle 12 in the area to the right of where the cord clamp 28 is located. The press fit between the handle insert 24 and the handle 12 maintains the handle insert 24 in a fixed position within the handle 12. The cord 26 is a three wire cord and within the interior of the handle 12 the outside insulation (not separately identified or numbered) of the cord 26 is stripped exposing the three electrical leads 32, 34 and 36.

Positioned within the interior of the handle insert 24 is a split composite socket formed of an electrically insulated material and having a top socket section 38 and a bottom socket section 40. The top socket section 38 includes a longitudinally located opening 42 through it rearmost portion which allows for projection of electrical lead 36 through the rearmost portion of the top socket section 38. The end of the insulation of the electrical lead 36 is stripped and the bare wire of electrical lead 36 is located, as explained below, between the interior of the handle insert 24 and central section 44 of the top socket section 38. This forms an electrical contact between electrical lead 36 and the handle insert 24.

The top socket section 38 can be mated and held with respect to the bottom socket section 40 by a projection 46 on the bottom socket section 40 which fits into an appropriate channel 48 formed in part by the central section 44 of the top socket section 38 and in its remaining part by an extension of the top socket section 38 which extends beyond the bottom socket section 40 toward the tip portion 14 of the soldering iron 10.

Two cavities, each formed in part in top socket section 38 and part in bottom socket section 40, are located in the composite socket which can be formed between top socket section 38 and bottom socket section 40. In FIG. 2, the foremost of these cavities has been removed by sectioning and the rearmost cavity, cavity 50, is seen in dotted lines. The cavity removed by sectioning is identical, except for location, to cavity 50. A crimp contact is located on the ends of each of the electrical leads 32 and 34. As with the cavities above, one of these crimp contacts has been removed by the sectioning of FIG. 2 and the remaining crimp contact, contact 52, attached to electrical lead 34 is shown in location within cavity 50. The other crimp contact would, of course, make an electrical contact with electrical lead 32 and would be located in the other unseen cavity.

In assembling the soldering iron 10, the appropriate crimp contacts, contact 52 and its other unseen contact, are located within the appropriate cavities, cavity 50 and the other unseen cavity, in the top and bottom socket sections 38 and 40 as these sections are brought together by aligning the projection 46 and the channel 48. The cord 26 then is pulled through the handle insert 24 appropriately positioning the composite socket formed of the two sections 38 and 40 within the handle insert 24. This, in turn, fixedly holds the crimp contacts within the cavities (e.g., contact 52 in cavity 50). At the same time, the electrical lead 36 is fixedly positioned between the top socket section 38 and the handle insert 24. The cord is then maintained in this position by crimping the cord crimp 28 to lock the composite socket within the handle insert 24. Next, the handle insert 24 is appropriately press fit into the handle 12.

With the heat deflector 16 already around the handle insert 24, the ferrule 22 is press fitted into the handle insert 24 and is maintained in the handle insert 24 by the friction between it and the handle insert 24. The ferrule 22 has a groove 54 in it which fits around a projection 56 formed on the top socket section 38. This maintains the ferrule 22 in alignment with the composite socket formed by sections 38 and 40.

The ferrule 22 has an inwardly projecting annular flange 58 in its center. Additionally, it has a groove 60 formed through a portion of its surface forward of the flange 58. A spacer 62 formed of an electrically insulated material fits within the ferrule 22 with its end 64 abutting against the flange 58 to appropriately locate the spacer 62 within the ferrule 22. The spacer 62 serves as a rear support for a flat blade heating element 66.

The heating element 66 includes on its rear end two electrical contacts, only one of which, contact 68, is seen in FIG. 2, however both contact 68 and contact 70 can be seen in FIG. 3. Contact 68 fits into the contact 52 which, in turn, was attached to electrical lead 34 and thus an electrical connection is formed between the heating element 66 and electrical lead 34. Contact 70 fits into the unseen contact attached to electrical lead 32 and makes electrical connection with it. A circuit is thus completed between the contact 68 and 70 with the electrical lines 34 and 36 by the interaction at these points.

Referring now to FIG. 3, the tip portion 14 includes a tip member 72 having a body section 74 and an operative tip section 76. A shoulder 78 separates the body 74 from the operative tip section 76. The body section 74 of the tip member 72 is cut so that it has a flat surface 80 extending longitudinally down the majority of its length. This flat surface 80 serves as a heat transfer surface for the tip member 72. The flat surface 80 lies directly against and is in intimate contact with the flat upper surface 82 of the heating element 66. This intimate association between the two flat surfaces 82 and 80 allows for effective, rapid and efficient heat transfer from the heating element 66 to the tip member 72. Because of this intimate relationship between these two surfaces, the tip member 72 need not be of a very large thermal mass. As a consequence, the overall size and weight of the soldering iron 10 is reduced with respect to known soldering irons. Further, because of the intimate relationship between the surfaces 80 and 82, there is rapid heat transfer from the heating element 66 to the tip member 72 such that the heating element 66 can continually supply heat to the tip member 72 during the soldering process. This intimate contact further results in rapid recovery of the heat to the operative tip section 76 of the tip member 72 upon withdrawal of heat during a particular soldering operation.

Immediately surrounding the tip member 72 and the heating element 66 is a protective tube 84. Surrounding all of the protective tube 84, the tip member 72 and the heating element 66 is a heater retaining tube 86. The end 88 of the heater tube 86 is crimped or flanged inwardly such that it surrounds the shoulder 78 of the tip member 72 fixedly retaining the tip member 72 within the interior of the heating tube 86. The other end of the heating tube 86 is formed with a flange 90 as seen in FIG. 2. A retaining nut 20 fits over the heating tube 86 and abuts against the flange 90. The ferrule 22 includes threads on its outer surface which mate with internal threads within the retaining nut 20 such that the retaining nut 20 can be screwed onto the ferrule 22. This fixedly holds the heater tube 86 to the ferrule 22.

One end of the protective tube 84, the end closest to the handle 12, is flanged outwardly such that the protective tube 84 fits around the spacer 62. This end of the protective tube 84 also includes a groove 94 which can be aligned with groove 60 in the ferrule 22 when the protective tube 84 is slid inside of the ferrule 22 such that it abuts against the flange 58 within the interior of the ferrule 22. A locking clip 96 fits around the ferrule 22 except for the area wherein groove 60 in the ferrule 22 and groove 94 within the protective tube 84 are located. The locking clip 96 fixedly holds the protective tube 84 and the spacer 62 to the ferrule 22. This locking clip 96, however, can be conveniently released from within the confines of the grooves 60 and 94 to release the protective tube 84 from the ferrule 22 allowing for easy exchange of the heating element 66 if necessary.

A spring member 98 fits underneath the bottom of the heating element 66 within the protective tube 84. The spring member 98 includes a section 100 which is bowed downwardly. An opening 102 in the protective tube 84 allows the section 100 to extend through the protective tube 84 and contact the heater tube 86. When the heater tube 86 is slid over the protective tube 84 with the heating element 66 and tip member 72 located therein and with the heating element 66 in contact with the tip member 72, the section 100 is compressed biasing the heating element 66 upwardly against the tip member 72 to insure the intimate contact between the tip member 72 and the heating element 66.

From the above construction, it can be seen that to change the tip member 72 one need only to undo the retaining nut 20 from the ferrule 22 which allows the heater tube 86 to be slipped off of the protective tube 84. In so slipping the heater tube 86 off of the protective tube 84, the bias of the spring element 98 is released and the tip member 72 can be easily extracted from the interior of the protective tube 84. A new tip member is then positioned on top of the heating element 66 and the heater tube 86 slipped over its end compressing or biasing the spring 98 at it goes over the protective tube 84. Once the heater tube 86 is all the way on the protective tube 84, the retaining nut 20 is once again threaded onto the ferrule 22.

To change the heating element, the heater tube 86 is removed as noted above and the locking clip 96 is removed. The protective tube 84 can then be removed such that a new heating element 66 can be inserted into the soldering iron 10.

The heating element 66 is prevented from shock and the like by the combination of being supported at its rear end by the spacer 62 and near its front end by the spring element 98. By so supporting the heating element 66, long life of this element is insured.

It is noted from the above description of the soldering iron 10, that there is only one threaded connection in the iron 10. This threaded connection being the connection between the retaining nut 20 and the ferrule 22. Insofar as both the ferrule 22 and the retaining nut 20 are not part of the thermal heat transferring mass of the soldering iron 10, they can be formed of appropriate corrosion resistant materials such as stainless steel or the like such that the threaded connection between the two is never compromised by corrosive vapors released from fluxes used in soldering or by the heat generated by the soldering iron 10.

As was noted above, electrical contact 36 is compressed against the handle insert 24. The ferrule 22 makes a metal to metal contact with the insert 24 and is thus electrically connected to the contact 36. In turn, the protective tube 84 makes a metal to metal contact with the ferrule 22 and thus also is in electrical contact with the lead 36. The heater tube 86 contacts the protective tube 84 and thus ultimately the heater tube 86 is in electrical contact with lead 36. The lead 36 serves as a ground then for the heater tube 86 to insure safe usage of the soldering iron 10.

I claim:

1. In an electric soldering iron having an elongated handle, an electric heating element, attachment means serving to mount said heating element on said handle, a tip member located so as to receive heat from said heating element, and holding means for holding said tip relative to said heating element, the improvement comprising:

said heating element being an elongated heating element having an elongated flat planar heated surface, said heating element extending outwardly from said attachment means and said handle;

said tip member including a body having an elongated flat planar heat transfer surface and an operative tip extending outwardly away from said body and separated from said body by a shoulder;

said tip member located with respect to said heating element such that said heated surface and said heat transfer surface are coplanar with each other with at least a portion of said flat heated surface proximate to at least a substantial portion of said heat transfer surface;

an elongated retaining tube having ends, one of said ends being provided with an internally extending flange, said retaining tube being positioned around said body of said tip member and said heating element so as to hold said tip member relative to said heating element in a position wherein said flange rests against said shoulder and said tip extends outwardly away from said heating element through one of said ends of said tube;

spring means located in said retaining tube and extending between said retaining tube and said heating element, said spring means for holding said portion of said heated surface and said substantial portion of said heat transfer surface intimately contiguous with each other; and said holding means comprising means connecting the other end of said retaining tube with said handle so as to prevent movement of said retaining tube and said tip member generally away from said handle.

2. In an electric soldering iron as claimed in claim 1 wherein:

said attachment means includes socket means mounted within said handle and terminal means on said heating element, said terminal means being held within said socket means.

3. In an electric soldering iron as claimed in claim 2 including:

a protective tube having ends, said protective tube located generally around said heating element and said body of said tip member, a first portion of said protective tube including one of the ends of said tube being located within the interior of said retaining tube, said retaining tube fitting closely against the exterior of said first portion of said protective tube;

protective tube holding means located on said handle in association with said holding means, said protective tube holding means for holding the other of the ends of said protective tube relative to said handle.

4. In an electric soldering iron as claimed in claim 3 wherein:

said protective tube holding means is an electrically conductive ferrule located generally around a part of said heating element and said protective tube; and including clip means operatively associated with both of said ferrule and said protective tube, said clip means for connecting said protective tube to said ferrule;

said tip member and said protective tube being electrically conductive, said tip member being in electrical contact with said protective tube, said protective tube being in electrical contact with said ferrule;

an electric cord for supplying electric power to said soldering iron, said cord including three conductors insulated from one another, one of said conductors being electrically connected to said ferrule, the other two of said conductors being electrically connected to said socket means of said attachment means for supplying electrical power to said terminal means of said heating element.

5. In an electric soldering iron as claimed in claim 4 wherein:

said heating surface and said heat transfer surface are located within said protective tube on the opposite side of said heating element from said spring means, said body of said tip member fitting closely within the interior of said protective tube;

said heating element being capable of being moved by said spring so as to hold said heated surface contiguous with said heat transfer surface.

6. In an electric soldering iron as claimed in claim 5 wherein:

said protective tube is cylindrical and said body of said tip member includes a hemi-cylindrical surface extending from the edges of said flat planar surface, said hemi-cylindrical surface fitting closely against the interior of said protective tube.

* * * * *